United States Patent Office.

HEINRICH BAUM, OF HÖCHST-ON-THE-MAIN, GERMANY, ASSIGNOR TO FARB-WERKE, VORMALS MEISTER, LUCIUS & BRÜNING, OF SAME PLACE.

DYE-STUFF OR COLORING-MATTER.

SPECIFICATION forming part of Letters Patent No. 251,163, dated December 20, 1881.

Application filed November 2, 1881. (Specimens.)

*To all whom it may concern:*

Be it known that I, HEINRICH BAUM, a citizen of Germany, residing at Höchst-on-the-Main, Germany, have invented new and useful Improvements in Dye-Stuffs or Coloring-Matters, of which the following is a specification.

The object of my invention is the manufacture of a deep-red scarlet dye-stuff or coloring-matter from the disulpho-betanaphtholic natrium salt insoluble in alcohol by means of the diazo compound derived from the amido-ethyl-xylol.

To produce the disulpho-betanaphtholic acid, one part of beta-naphthol is mixed with three parts of sulphuric acid, the mixture being heated for twelve hours at a temperature of 212° to 230° Fahrenheit. Two isomere disulpho-betanaphtholic acids are thereby obtained, from which the soda salts are easily separated by being digested with three or four parts of alcohol, the salt that is insoluble in alcohol being filtered and dried, while the soluble salt is extracted by evaporation and dried. The first is used for producing the coloring-matter being the object of this invention.

To obtain the coloring-matter, six and one-half parts of amido-ethylxylol are dissolved in twelve parts of muriatic acid (specific gravity 1.16 to 1.18) and one hundred parts of water, to which are added four and one-half parts of pure nitrite of potash. This solution is poured into twenty pounds of the above-described di-sulpho-betanaphtholic salt (insoluble in alcohol) dissolved in two hundred parts of water and ten parts of ammonia, (ten per cent.,) when the coloring-matter precipitates in form of a paste. This paste is dissolved, precipitated with common salt, and dried. A powder is thereby obtained which will dye wool or silk with a deep red scarlet shade that will stand light and soaping.

My coloring dissolves in concentrated sulphuric acid with a bluish-red color.

By treating the coloring-matter with tin and muriatic acid a yellowish-white precipitate of beta-amido-naphthol disulpho acid is obtained, and the solution contains chlorhydrate of amido-ethylxylol.

I do not limit myself to the exact proportions, as they may be varied without departing from the principle of my invention.

What I claim as new, and desire to secure by Letters Patent, is—

As a new article of manufacture, a deep-red scarlet dye-stuff or coloring-matter having the characteristics above stated.

In testimony whereof I have hereunto set my hand and seal in the presence of two subscribing witnesses.

HEINRICH BAUM. [L. S.]

Witnesses:
FERDINAND VOGELER,
GOTTFRIED RADERMACHER.